United States Patent [19]
Heyman

[11] Patent Number: 6,002,864
[45] Date of Patent: Dec. 14, 1999

[54] HOST ADDRESSES A CLIENT DEVICE USING PERMANENT NAME PROVIDED BY THE CLIENT DEVICE WITHOUT REQUIRING A TRANSFER OF AN APPC VERB

[76] Inventor: Eran Heyman, 15 Tarshish St., Ramat Hasharon, Israel

[21] Appl. No.: 08/934,205

[22] Filed: Sep. 19, 1997

[51] Int. Cl.⁶ ..................................................... G06F 13/00
[52] U.S. Cl. ............................... 395/500.44; 395/500.47; 395/500.48
[58] Field of Search ............................... 395/500, 500.44, 395/500.47, 500.48

[56] References Cited

U.S. PATENT DOCUMENTS 5,572,711 11/1996 Hirsch et al. ............................ 395/500
5,754,830 5/1998 Butts et al. ............................... 395/500

*Primary Examiner*—Le Hien Luu
*Attorney, Agent, or Firm*—Mark M. Friedman

[57] ABSTRACT

A method of enabling communication between a terminal emulator client device and a host computer through an intermediary server computer. The terminal emulator client device is preferably a computer which operates according to the TN5250 terminal emulation protocol. The host computer is preferably an AS400. The intermediary server computer is preferably operating SNA software. The present invention includes a communication interface software which acts as a client to the host computer, and as a server to the client device, and which is preferably operated by the intermediary server computer. The software of the present invention enables direct addressing of the client device through a permanent name.

26 Claims, 3 Drawing Sheets

HOST ADDRESSES A CLIENT DEVICE USING PERMANENT NAME PROVIDED BY THE CLIENT DEVICE WITHOUT REQUIRING A TRANSFER OF AN APPC VERB

FIELD AND BACKGROUND OF THE INVENTION

The present invention relates to a communication protocol for interactions between a server and a terminal or printer emulator device. Specifically, the present invention can be used to enable terminal and printer emulator devices, such as those emulating a TN5250 terminal, to be named with a permanent device name. Furthermore, the method of the present invention can also be used to enable a printer emulator to be named with a printer device name within a client/host system.

Terminal and printer emulator devices are an integral element of the AS400 client/host computer system. Hereinafter, the term "client/host" refers to a computer system in which one computer, the "host", controls the other devices within the system, which are the "clients". In such a system, terminal or printer emulator devices are the clients. Such devices may be PC (personal computer) computers or they may be dumb terminal devices. Hereinafter, the term "PC" refers to any computer which can provide an environment in which the TN5250 terminal emulation can be executed, including UNIX workstations, VT terminals operating VMS, those computers which operate the DOS operating system, or one of the Windows operating systems by Microsoft (Seattle, Washington, USA), including Windows NT, Windows 3.x (in which "x" is a version number, such as "Windows 3.1") and Windows95. Hereinafter, the name "dumb terminal device" refers to a device which has a video monitor and a keyboard, and which may include a mouse or other input device, but which substantially lacks computational hardware which would enable the dumb terminal device to perform significant independent computations, such that the terminal device is only capable of acting as a dumb terminal. Indeed, as its name suggests, the dumb terminal device is dependent upon the server for the performance of a substantial portion of computations required for the operation of the dumb terminal device.

In any case, regardless of whether the terminal emulator is capable of independent calculations, such as a PC, or is simply a dumb terminal device which is dependent upon instructions from the host, the term "terminal emulator" implies that the device is emulating a certain type of monitor display according to a well known emulation protocol such as TN5250. In fact, the phrase "TN5250 terminal emulator" is simply a generic name for AS400 system terminals. The term "printer emulator" implies that the device is emulating a certain type of printer, again according to a well known emulation protocol. Such a protocol enables the host computer to interact with the client device according to established rules. For the sake of convenience, the description below mainly centers upon terminal emulator devices, it being understood that similar concepts apply to printer emulator devices with a few modifications. These modifications will also be described below.

An example of a client/host system which employs these terminal and printer emulator devices is the AS400 system of IBM (International Business Machines) Corporation. The AS400 system has a main, host computer which is the AS400 computer itself. The system also includes a plurality of clients, which are terminal emulator devices, and an intermediary server computer, which is the SNA server. The SNA server is actually a computer running a proprietary version of the general SNA software. One example of such a server is a computer being operated by the Windows NT operating system, and running the SNA software of Microsoft.

Although there are a number of different versions of the proprietary SNA software, all examples of such software have the general functionality for performing the SNA functions within the AS400 general environment. Basically, the AS400 computer sends instructions to the client terminal emulator devices through the SNA server. The terminal emulator devices can also send data to the AS400 computer, again through the SNA server, so that the flow of data is bi-directional. All of these terminal emulators have some type of communications protocol through which they interact with the SNA server. However, not all of these emulation protocols offer all of the desired functionality.

For example, within a system using terminal emulator devices, there are typically three types of devices. The first type of device is printer devices, which print material upon the receipt of printer commands. Printer devices must have a printer device name in order to receive commands from the server computer. Thus, printer devices have permanent printer device names to designate them within the client/host system.

The second type of device is the terminal emulator device as described previously. As for terminal devices, there are also terminal emulator devices connected with a specific permanent device name, although such a permanent name is optional. These hardware devices can be contacted within the system according to this device name. For example, such a permanent device name is useful if a user on one terminal emulator wishes to send a message to other terminal emulator devices within the client/host system. The device name is also useful for security reasons, since activity emanating from a terminal emulator device with a particular name will always be associated with one particular hardware device.

However, since the permanent device name is optional for terminal emulator devices, not all terminal emulation protocols support such permanent terminal emulator device names. Indeed, one of the most popular terminal emulation protocols, TN5250, only supports temporary, dynamically assigned device names for terminal emulator devices, which are reassigned each time the terminal emulator device establishes a connection with the host computer. The name is therefore highly variable. Indeed, every time the terminal emulator device becomes connected to the host computer, the device name could potentially be changed. Thus, the added advantages of permanent device names are not available within many AS400 client/host systems.

Therefore, there is an unmet need, and it would be highly useful to have, method for enabling emulation protocols, such as the terminal emulation protocol TN5250, to specify device names for terminal and printer emulator devices within a client/host system such as the AS400.

SUMMARY OF THE INVENTION

According to the present invention, there is provided a method for enabling communication between a host computer and a client device during a communication session, the client device having an emulator protocol software, and the host computer being an AS400 computer having an AS400 operating system software, the method including the steps of: (a) providing a communication interface software for being operated by the host computer, the interface software acting as a client software for the AS400 operating system software of the host computer, and the interface software acting as a server software for the emulator protocol software of the client device; (b) sending a request to start the communication session from the emulator protocol software of the client device to the server software, the request including a permanent name of the client device; (c) passing the request from the server software to the client software; and (d) sending the request from the client software to the AS400 protocol software of the host computer, such that the host computer is able to address the client device by the permanent name. Preferably, the request further includes at least one parameter selected from the group consisting of AS400 computer host name, status of emulator device as a printer or a terminal, and identity of the emulation protocol.

According to preferred embodiments of the present invention, the method preferably further includes the steps of: (e) sending information from the AS400 operating system software of the host computer to the client software; (f) giving the information from the client software to the server software; and (g) sending the information from the server software to the emulator protocol software of the client device, the information being addressed to the client device according to the permanent name. Preferably, information is additionally transferred from the client device to the host computer, such that the transfer of information is substantially bi-directional.

According to other preferred embodiments of the present invention, preferably the method further includes the steps of: (h) closing the communication session between the client device and the server software, the closure being effected by the client device; (i) communicating the closure to the client software by the server software; and (j) sending a request to close the session from the client software to the AS400 operating system software of the host computer.

Alternatively and preferably the method further includes the steps of: (h) sending a deallocation statement from the host computer to the client software; (i) communicating the deallocation statement from the client software to the server software; and (j) causing the session between the server software and the emulator protocol software of the client device to be closed according to the deallocation statement.

Preferably, the method further includes the step, before step (a), of providing an intermediary server computer for acting as a server to the client device, and for acting as a client to the host computer, such that communication between the client device and the host computer is passed through the intermediary server computer. More preferably, the communication interface software is operated by the intermediary server computer.

According to still other preferred embodiments of the present invention, the client device is a terminal emulator device and the emulator protocol software is a terminal emulation protocol software. More preferably, the terminal emulation protocol software is TN5250 emulation protocol software. Even more preferably, the server software is operated according to a TN5250 server communication protocol, and the client software is operated according to an APPC client communication protocol. Most preferably, the communication session between the host computer and the client device is performed according to the TCP/IP communication protocol, substantially without requiring a transfer of an APPC verb from the client device.

According to another preferred embodiment of the method of the present invention, the client software of the communication interface software communicates with the AS400 operating system software through at least one AS400 application programming interface selected from the group consisting of ICF (Internal Communication Functions) and APPC.

According to yet another preferred embodiment of the present invention, the client device is a printer emulator device and the emulator protocol software is a printer emulation protocol software.

According to another embodiment of the present invention, there is provided a method for enabling communication between a host computer and a client device during a communication session, the client device having an emulator protocol software, the host computer being an AS400 computer having an AS400 operating system software, the communication being passed between the host computer and the client device through an intermediary server computer, and the intermediary server computer having an SNA server software, the method including the steps of: (a) providing a communication interface software for being operated by the intermediary server computer, the interface software acting as a client software for the AS400 operating system software of the host computer, and the interface software acting as a server software for the emulator protocol software of the client device; (b) sending a request to start the communication session from the emulator protocol software of the client device to the server software, the request including a permanent name of the client device; (c) passing the request from the server software to the client software; and (d) sending the request from the client software to the AS400 operating system software of the host computer, such that the host computer is able to address the client device by the permanent name.

Preferably, the method further includes the steps of: (e) sending information from the AS400 operating system software of the host computer to the client software on the intermediary server computer; (f) giving the information from the client software to the server software; and (g) sending the information from the server software to the emulator protocol software of the client device, the information being addressed to the client device according to the permanent name, such that the information is transferred from the host computer to the client device. Also preferably, information is additionally transferred from the client device to the host computer through the intermediary server computer, such that the transfer of information is substantially bi-directional.

More preferably, the method further includes the steps of: (h) closing the communication session between the client device and the server software, the closure being effected by the client device; (i) communicating the closure to the client software by the server software; and (j) sending a request to close the session from the client software to the AS400 operating system software of the host computer.

Alternatively and preferably, the method further includes the steps of: (h) sending a deallocation statement from the host computer to the client software; (i) communicating the deallocation statement from the client software to the server software; and (j) causing the session between the intermediary server computer and the emulator protocol software of the client device to be closed according to the deallocation statement.

The term "TN5250" is an acronym for an emulation protocol which passes 5250 data over telnet. Hereinafter, the term "terminal emulation protocol" includes any such telnet emulation protocol, as well as any other terminal emulation protocol which is capable of providing the general environment and functionality of such telnet emulation protocols. Hereinafter, the term "network" refers to a communication link between at least two computers, including the Internet, any intranet and any other such link. Hereinafter, the term "APPC" refers to "Advanced Program to Program Communication", which is a set of LU6.2 API verbs and the SNA LU6.2 protocol functions providing distributed communications capability to the applications. Hereinafter, the term "TCP/IP" stands for "transmission control protocol/ internet protocol", which contains three layers: network, transmission and application. "SNA" stands for "system network architecture". Hereinafter, the term "APPC verb" includes both APPC verbs and their functional equivalents.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of method for enabling terminal emulator devices, operating according to a specific terminal emulation protocol, to have a specific permanent device name, rather than a temporary name which changes according to the operation of the client/host system. Specifically, according to one embodiment, the present method enables certain functions of the communications protocol layer to be moved from the terminal emulator devices onto at least one of the server devices or onto the host computer itself. Such a shift in these communications functions significantly increases the flexibility of the client/host system, which is intended to operate with management functions on the host computer. Thus, the method of the present invention simply enables the server computer to have more control over the client terminal emulator devices, including such features as permanent device names for the client terminal emulator devices, without the necessity of passing APPC verbs from the terminal emulator devices. Of course, if an intermediary SNA server is present between the host computer and the terminal emulator devices, APPC verbs may be passed between the intermediary server and the host computer.

The principles and operation of the communications method according to the present invention may be better understood with reference to the drawings and the accompanying description. It should be noted that the following description will make reference to the AS400 system as an illustrative example of a client/host system, it being understood that this is for the sake of clarity only and is not meant to be limiting in any way.

Figure 1:
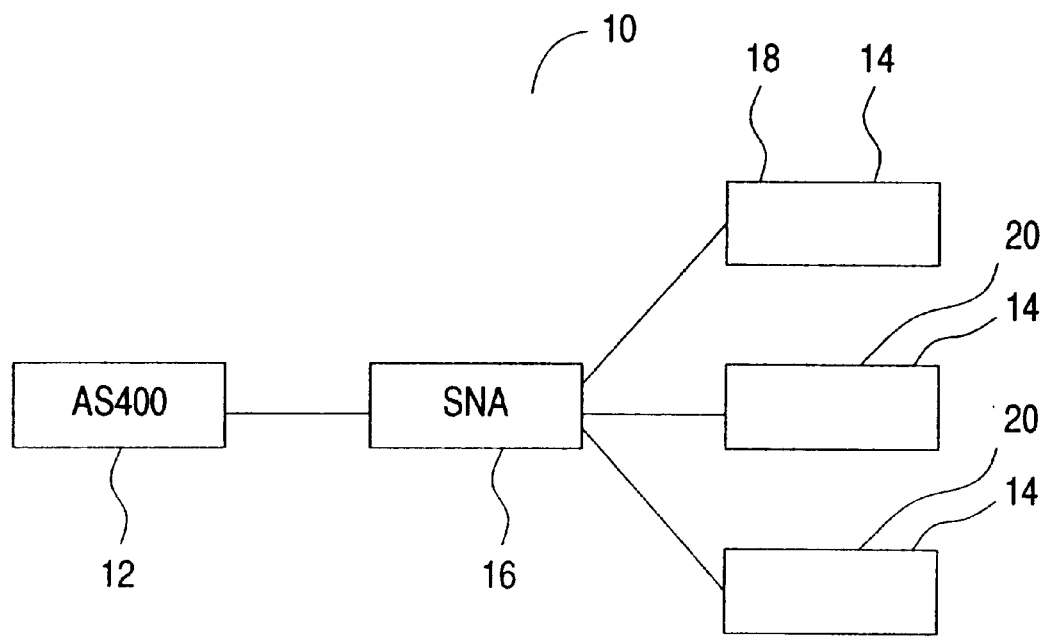
FIG. 1 is an illustration of an exemplary prior art AS400 client/host system.

Referring now to the drawings, FIG. 1 is an exemplary illustration of a prior art AS400 system. An AS400 system 10 includes an AS400 host computer 12, which as noted before is the proprietary technology of IBM. AS400 host computer 12 interacts with a plurality of client devices 14 through an intermediary SNA server 16. In this example, SNA server 16 is preferably a PC computer operating the Windows NT operating system and the proprietary SNA software of Microsoft, although other proprietary SNA software is available from other vendors.

Each client device 14 commuunicates with AS400 host computer 12 through SNA server 16, for example to receive information and instructions from host computer 12. Client device 14 could be a printer emulator device 18 or a terminal emulator device 20. Hereinafter, these devices will be collectively referred to as "emulator devices". Terminal emulator device 20 is operated according to a terminal emulation protocol, such as the TN5250 protocol. For the sake of clarity, this discussion will center upon devices using the TN5250 protocol, it being understood that this is for discussion purposes only and is not meant to be limiting in any way.

Terminal emulator devices 20 which are operated according to the prior art TN5250 protocol communicate with SNA server 16 according to a two-layer communication protocol. The first layer is can be any suitable communication protocol for communication on a network such as the Internet, such as the common TCP/IP protocol. The second layer is APPC, or Application to Application Communication, and is the communication protocol of the AS400 system. APPC is required for terminal emulator device 20 to interact with AS400 server computer 12 through SNA server 16. Such interaction occurs through APPC "verbs", or specific function calls which enable terminal emulator device 20 to both receive information from AS400 host computer 12 and to send information to AS400 host computer 12. These verbs are actually transferred over the network from terminal emulator device 20. Thus, in the prior art system, the APPC protocol software actually runs on terminal emulator device 20, enabling the transfer of the APPC verbs over the network.

The APPC protocol permits terminal emulator device 20 to specify the type of emulation protocol being used, as well as the device name and the port for the desired AS400 host computer, through the APPC verbs. Terminal emulator device 20 passes his information to SNA server computer 16, which then communicates with AS400 host computer 12. However, one type of information which cannot be passed from terminal emulator device 20 to AS400 host computer 12 is a permanent device name for terminal emulator device 20, due to limitations imposed by the currently available TN5250 protocol.

Figure 2:
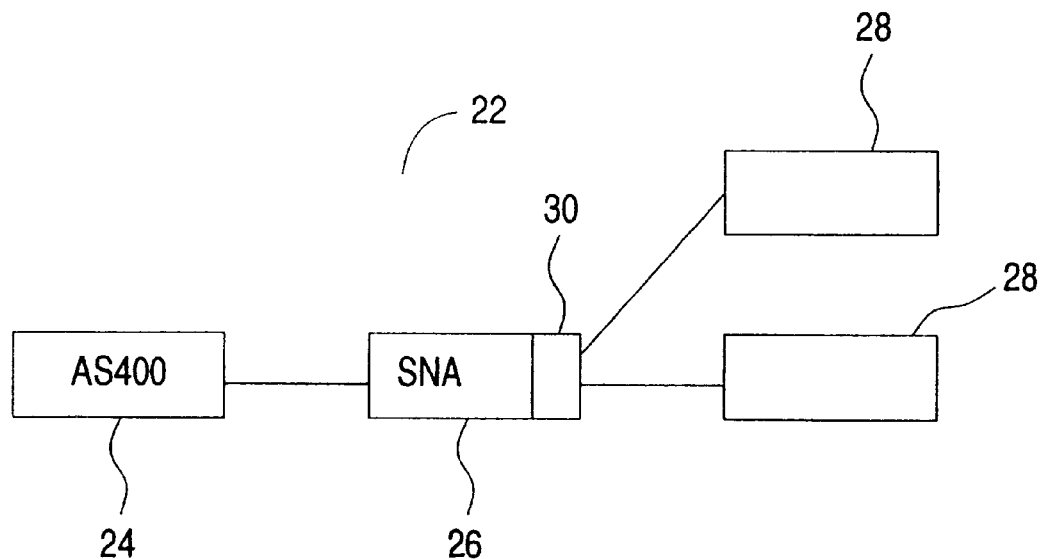
FIG. 2 shows the client/host system of the present invention.

FIG. 2 is a block diagram of an illustrative example of an AS400 system using the communications software of the present invention. AS400 system 22 again includes an AS400 computer server 24, an SNA server 26 and a plurality of client devices, which for the sake of clarity are shown only as terminal emulator devices 28. Although the basic hardware of AS400 system 22 is the same as for FIG. 1, the communications protocol has been changed. Now, terminal emulator devices 28 have a communication protocol with only one layer, which is the TCP/IP protocol for communication with SNA server 26 over the network. The APPC communication protocol layer has been moved to SNA server 26, in the form of a communication interface software 30. Communication interface software 30 is run on SNA server 26. Alternatively and preferably, communication interface software 30 could be run on AS400 host computer 24. Also alternatively and preferably, communication interface software 30 could be run on an entirely separate computer (not shown), other than SNA server computer 18 or AS400 host computer 24.

Communication interface software 30 acts as both a client for the APPC protocol software, and a server for the TN5250 protocol software. As a client for the APPC protocol software, communication interface software 30 communicates with AS400 computer host 24. As a server for the TN5250 protocol software, communication interface software 30 sends these instructions and information to terminal emulator devices 28. Thus, the APPC verbs are no longer being sent from terminal emulator devices 28. Instead, the APPC verbs are sent from communication interface software 30 on SNA server computer 26 to AS400 host computer 24, in response to interactions between communication interface software 30 and the TN5250 protocol software on terminal emulator devices 28.

These interactions include data and parameters which are sent from terminal emulator devices 28 to AS400 host computer 24, preferably via SNA server computer 26. As described further below, the data and parameters can include such information as a permanent device name. According to preferred embodiments of the present invention, the TN5250 protocol is modified slightly to permit the TN5250 software on terminal emulator devices 28 to send a permanent device name to AS400 host computer 24 through SNA server computer 26. Thus, preferably the IN5250 protocol software is able to send various parameters to communication interface software 30, which then sends the information with appropriate APPC verbs to AS400 host computer 24.

Figure 3A:
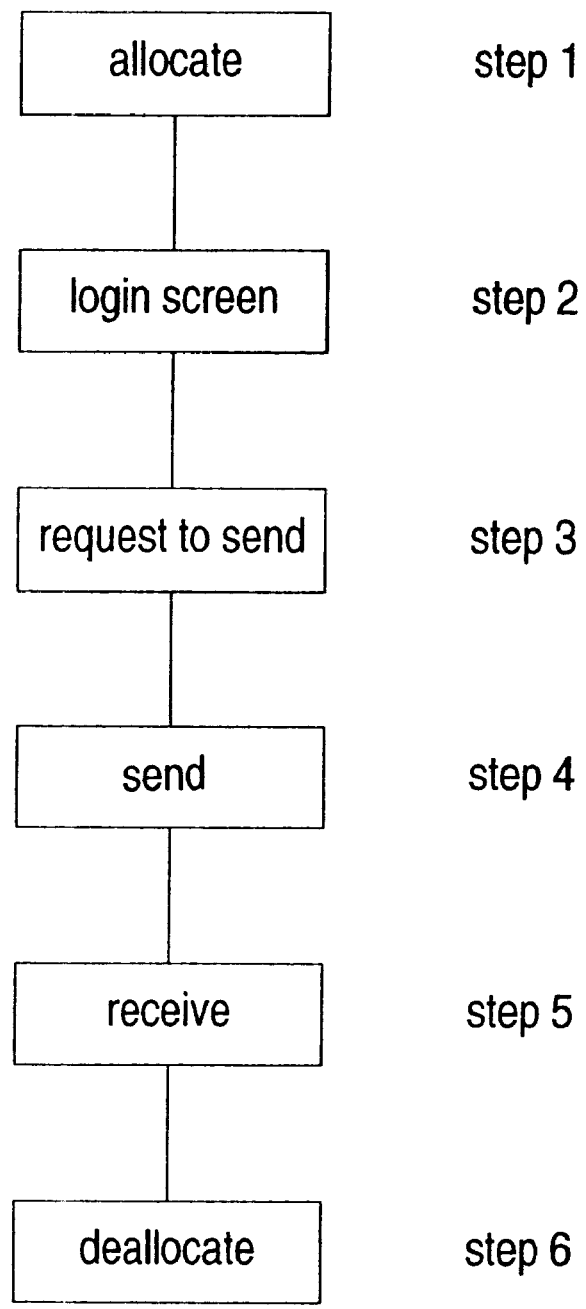
FIGS. 3A and 3B are flow charts of the method according to the present invention.
Figure 3B:
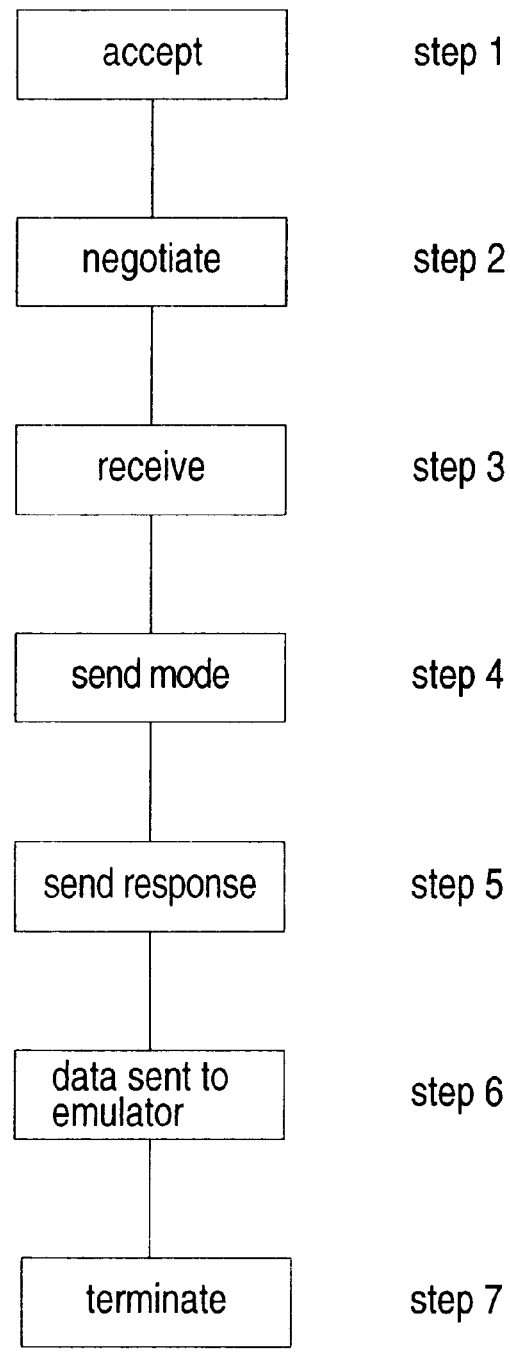

FIGS. 3A and 3B are flow charts of a method according to the present invention, in which the steps are outlined for a complete client/host interaction, or "session", through the communication interface software of the present invention. The session is started by a request from TN5250 protocol software on a client terminal emulator device to the AS400 host computer through the intermediary SNA server. Commands are then passed from the AS400 host computer to the terminal emulator device through the communication interface software of the present invention. Data is also sent from the terminal emulator device to the AS400 host computer, again through the communication interface software of the present invention. Finally, the session is closed, either by the request of the terminal emulator device or the command of the AS400 host computer.

FIG. 3A shows the steps performed by the APPC client portion of the communication interface software, hereinafter referred to as the "APPC client". FIG. 3B shows the steps of the TN5250 portion of the software of the present invention, hereinafter referred to as the "TN5250 server". Both portions are being operated either simultaneously or substantially simultaneously during a single client/host session, but are shown separately for the sake of clarity. For the purposes of clarity, this description of the method of the software of the present invention will center upon the preferred AS400 system of FIG. 2, in which a terminal emulator device is connected to the AS400 host computer through an SNA server computer.

In order to open a client/host session, as noted above, the terminal emulator device must request such a session from the AS400 host. Such a request is made by having the emulation protocol software of the terminal emulator device sending a command with at least one parameter to the communication interface software of the present invention, which then interprets the command and the parameter in the form of an APPC verb. The APPC verb and the parameter are then sent to the AS400 operating system software of the AS400 host computer. According to preferred embodiments of the present invention, the client portion of the communication interface software of the present invention communicates with the AS400 operating system software through at least one AS400 application programming interface selected from the group consisting of ICF (Internal Communication Functions) and APPC.

Step 1 of FIG. 3A shows the APPC client portion of the communication interface software of the present invention sending the verb "allocate", with a list of parameters, to the AS400 host computer. The verb "allocate" is sent upon receipt of a request to start a communication session from the emulator protocol software through the TN5250 server software, as described in FIG. 3B below. "Allocate" causes a session to be allocated with the appropriate transaction on the AS400 host computer. The transaction handles the interface with the client device, whether the client device is a terminal emulator device, or a printer emulator device. The entire procedure uses the information from the list of parameters to determine the present configuration of the terminal emulator device.

The list of parameters which is sent with the verb "allocate" includes both optional and required information. The most important parameter which is sent with "allocate" is the terminal or printer emulator device name, which enables the host computer to address the client device by the permanent name. Without this name, the communication interface software of the present invention is unable to use the permanent device name for the terminal emulator device. Furthermore, if a printer emulator device is present, it cannot be used at all without a permanent device name.

Other necessary parameters are the computer host name, the desired port of the host, the SNA server name, the status of a device as a printer or a terminal, and the printer or terminal emulation. The computer host name is the name for the desired AS400 computer host, while the SNA server name is the name for the desired SNA server computer. The printer or terminal emulation is the emulation protocol being used by the client device. In this example, the emulation protocol is the TN5250 terminal emulation protocol being used by the terminal emulation device.

The remaining parameters are optional in the sense that they are dependent on the type of client device. Printer emulator devices need two additional parameters, the message queue and message library. Terminal emulator devices need an indication as to whether the "autosign-on" function is to be enabled. Terminal emulator devices also need a user name and a password to enable the APPC client to connect to the AS400 computer host. These parameters are thus specific to the printer or terminal emulator device.

Other optional parameters include those which enable the device to receive a list of all possible AS400 computer hosts, as well as a list of all possible device names to which the user can be connected. These lists are provided after a special request has been sent to the SNA server computer.

Once the "allocate" verb has been sent, the APPC client portion of the communication interface software waits for a response from the AS400 host which states whether the connection was established. If the connection was established correctly, then information and instructions are sent to the terminal emulator device in step 2 of FIG. 3A. Generally, such instructions include the command to display the first monitor screen which is usually a "login" screen. It should be noted that in the prior art example of FIG. 1, this step would have been performed by the terminal emulator device itself.

The user operating the terminal emulator device can now type data, such as a user name and a password in order to "log on", or gain access, to the AS400 host. After the data have been entered, the user presses an "aid key", which is the "enter" key or other function key", and the data are ready to be sent to the AS400 host. In order to send the data, the following steps are completed.

In step 3 of FIG. 3A, the APPC client portion of the communication interface software sends a "request to send" verb to the AS400 host, if the APPC client is not already in the "send" state. As noted previously, the term "APPC client" refers to the APPC client portion of the communication interface software, which appears as an independent client to the AS400 host computer. The APPC client must be in the "send" state prior to sending data because the APPC protocol has a state dependency. Thus, the APPC client can either be in a "send" state for sending data, or a "receive" state for receiving data, but not both simultaneously.

In step 4, the APPC client sends the data, which in this case is "login" information to enable the user of the terminal emulator to interact with the AS400 host.

Once the data is sent, the APPC client uses the verb "prepare to receive", as shown in step 5. This verb causes the state of the APPC client to change from "send" to "receive", so that data can be received from the AS400 host. These changes of state recur throughout the session between the APPC client and the AS400 host, until the end of that session.

In step 6, the session is ended by the verb "deallocate". This verb is sent from the APPC client portion of the software of the present invention to the terminal emulator device, if the session is closed by the emulator device. Alternatively, if the AS400 computer host closes the session, the APPC client receives an error message as soon as the APPC client goes into the "receive state". The error message states that the AS400 computer host has closed the session. The APPC client then sends the verb "deallocate" to the terminal emulator device.

FIG. 3B describes the above exemplary communication session according to the steps performed by the "TN5250 server", which again is simply another portion of the communication interface software of the present invention. The session is again described from the initialization to the end according to functions provided by the TN5250 server. It should be noted that these functions would normally be performed by currently available TN5250 servers, such as those on currently available SNA servers and AS400 host computers. Unfortunately, these prior art TN5250 servers lack the desired functionality of permanent device names for emulator devices, especially for printer emulator devices. This additional desired functionality is provided by the communication interface software of the present invention, in particular by the TN5250 server portion of that software.

As for FIG. 3A, for the purposes of clarity, this description of the method of the software of the present invention will center upon the preferred AS400 system of FIG. 2, in which a terminal emulator device is connected to the AS400 host computer through an SNA server computer.

In step 1 of FIG. 3B, the TN5250 server first adds and binds a socket, and then listens once on the socket to all of the clients, or terminal emulator devices in this example, which are connected to the intermediary SNA server on the network via a listening socket. When a request comes from a terminal emulator device, the TN5250 server performs the function "accept" to accept the new connection from a terminal emulator device. This establishes a new TCP/IP session between the TN5250 server and the terminal emulator device client. The TN5250 server can perform the "accept" function many times.

In step 2 of FIG. 3B, the terminal emulator device client and the TN5250 server start to negotiate the type of session by exchanging parameters such as the terminal type and the permanent device name of the terminal emulator, and the host name and port of the desired AS400 host computer, respectively. The SNA server computer name is not part of the negotiation because, in this preferred embodiment, the terminal emulator client is already connected to the SNA server substantially before the start of these negotiations.

The exchange of parameters occurs via two functions: "recv", which enables the TN5250 server to receive data from the terminal emulator device; and "send", which enables the TN5250 server to send data to the terminal emulator device. Other, bi-directional data exchanges between the TN5250 server and the terminal emulator device also occur through these functions. However, the current TN5250 protocol does not enable synchronization, so that the TN5250 server does not exhibit substantially the same state dependency as the APPC client. In other words, the TN5250 server and the terminal emulator client currently do not change states before sending and receiving data, although such state dependency is theoretically possible.

In order for the terminal emulator device to send the permanent device name to the TN5250 server, the TN5250 protocol software on the terminal emulator device must be suitably modified. Specifically, the software on the terminal emulator device must be able to include the permanent device name in the parameters which are sent to the TN5250 server. The parameters also include whether the emulator device is a terminal, as in this example, or a printer, and the emulation protocol which is employed.

In step 3, the TN5250 server first requests the start of a communication session between the host computer and the client device, by sending the request to the client software, as described in FIG. 3A. The TN5250 server then uses the "receive" function to receive the first login screen from the APPC client, as described previously for FIG. 3A.

In step 4, the TN5250 server uses the "send" function to send the first login screen to the terminal emulator device via the network.

In step 5, the terminal emulator device sends the response, which is usually the login name and password, to the TN5250 server via the network. The TN5250 server then passes the response to the AS400 host computer through the APPC client.

In step 6, a response is sent from the AS400 host computer to the APPC client, and from the APPC client to the TN5250 server. The TN5250 server then passes the data to the terminal emulator device.

In step 7, the terminal emulator device simply closes the socket and terminates the session, usually at the request of the user operating the terminal emulator device. Alternatively, if the AS400 host computer closes the session, the APPC client receives an indication that deallocation has occurred, as described in FIG. 3A. The TN5250 server then closes the socket with the terminal emulator device.

The communication interface software of the present invention has a number of advantages over the prior art TN5250 interface software. One of the primary advantages is that the communication interface software can receive a permanent device name from an emulator device, which will then be used to designate all further interactions with that emulator device. The permanent device name is required for a printer emulator device, which cannot function without such a permanent name. A permanent device name is also better for the overall security of the AS400 system, since it enables all interactions with a particular emulator device to be monitored. As an additional example, specific messages can also be sent to a particular terminal emulator device, which is more complicated without permanent device names.

Another advantage of the communication interface software of the present invention is that it is operated either by the AS400 host computer or by the SNA server computer, rather than by the emulator device. As a result, APPC verbs, or their functional equivalent, do not need to be passed from and to the emulator device, but only from the communication interface software to the AS400 host. Passing these verbs from the emulator device client to the AS400 host computer is much less efficient, since a large amount of complicated information must be transferred according to the sophisticated logic of the APPC protocol. By contrast, the communication interface software of the present invention requires only simple data, such as the previously described parameters, to be passed from the emulator device client to the AS400 host computer over the TCP/IP connection. Thus, the software of the present invention enables a much more efficient operation of the TCP/IP connection between the emulator client device and the host computer.

Furthermore, the communication interface software gives additional control to the host side of the client/host system. For example, in the preferred embodiment in which the communication interface software is operated by the SNA server computer, only one such computer is required for a plurality of emulator devices, and hence only one computer must operate the software of the present invention.

While the invention has been described with respect to a limited number of embodiments, it will be appreciated that many variations, modifications and other applications of the invention may be made.

What is claimed is:

1. A method for enabling communication between a host computer and a client device during a communication session, the client device having an emulator protocol software, and the host computer being an AS400 computer having an AS400 operating system software, the method comprising the steps of:
   (a) providing a communication interface software for being operated by the host computer, said interface software acting as a client software for the AS400 operating system software of the host computer, and said interface software acting as a server software for the emulator protocol software of the client device;
   (b) sending a request to start the communication session from the emulator protocol software of the client device to said server software, said request including a permanent name of the client device;
   (c) passing said request from said server software to said client software; and
   (d) sending said request from said client software to the AS400 protocol software of the host computer, such that the host computer is able to address the client device by said permanent name, without requiring a transfer of an APPC verb between the host computer and the client device.

2. The method of claim 1, further comprising the steps of:
   (e) sending information from the AS400 operating system software of the host computer to said client software;
   (f) giving said information from said client software to said server software; and
   (g) sending said information from said server software to the emulator protocol software of the client device, said information being addressed to the client device according to the permanent name, such that said information is transferred from the AS400 host computer to the client device.

3. The method of claim 2, wherein information is additionally transferred from the client device to the host computer, such that said transfer of information is substantially bi-directional.

4. The method of claim 2, further comprising the steps of:
   (h) closing the communication session between the client device and said server software, said closure being effected by the client device;
   (i) communicating said closure to said client software by said server software; and
   (j) sending a request to close the session from said client software to the AS400 operating system software of the host computer.

5. The method of claim 2, further comprising the steps of:
   (h) sending a deallocation statement from the host computer to said client software;
   (i) communicating said deallocation statement from said client software to said server software; and
   (j) causing the session between said server software and the emulator protocol software of the client device to be closed according to said deallocation statement.

6. The method of claim 1, further comprising the step, before step (a), of providing an intermediary server computer for acting as a server to the client device, and for acting as a client to the host computer, such that communication between the client device and the host computer is passed through said intermediary server computer.

7. The method of claim 6, wherein said communication interface software is operated by said intermediary server computer.

8. The method of claim 1, wherein the client device is a terminal emulator device and the emulator protocol software is a terminal emulation protocol software.

9. The method of claim 8, wherein said terminal emulation protocol software is TN5250 emulation protocol software.

10. The method of claim 9, wherein said server software is operated according to a TN5250 server communication protocol, and said client software is operated according to an APPC client communication protocol.

11. The method of claim 10, wherein the communication session between the host computer and the client device is performed according to the TCP/IP communication protocol.

12. The method of claim 11, wherein said client software of said communication interface software communicates with the AS400 operating system software through at least one AS400 application programming interface selected from the group consisting of ICF (Internal Communication Functions) and APPC.

13. The method of claim 1, wherein the client device is a printer emulator device and the emulator protocol software is a printer emulation protocol software.

14. The method of claim 1, wherein said request further includes at least one parameter selected from the group consisting of AS400 computer host name, status of emulator device as a printer or a terminal, and identity of the emulation protocol.

15. A method for enabling communication between a host computer and a client device during a communication session, the client device having an emulator protocol software, the host computer being an AS400 computer having an AS400 operating system software, the communication being passed between the host computer and the client device through an intermediary server computer, and the intermediary server computer having an SNA server software, the method comprising the steps of:

(a) providing a communication interface software for being operated by the intermediary server computer, said interface software acting as a client software for the AS400 operating system software of the host computer, and said interface software acting as a server software for the emulator protocol software of the client device;

(b) sending a request to start the communication session from the emulator protocol software of the client device to said server software, said request including a permanent name of the client device;

(c) passing said request from said server software to said client software; and (d) sending said request from said client software to the AS400 operating system software of the host computer, such that the host computer is able to address the client device by said permanent name, without requiring a transfer of an APPC verb between the host computer and the client device.

16. The method of claim 15, further comprising the steps of:

(e) sending information from the AS400 operating system software of the host computer to said client software on the intermediary server computer;

(f) giving said information from said client software to said server software; and (g) sending said information from said server software to the emulator protocol software of the client device, said information being addressed to the client device according to the permanent name, such that said information is transferred from the host computer to the client device.

17. The method of claim 16, wherein information is additionally transferred from the client device to the host computer through the intermediary server computer, such that said transfer of information is substantially bi-directional.

18. The method of claim 16, further comprising the steps of:

(h) closing the communication session between the client device and said server software, said closure being effected by the client device;

(i) communicating said closure to said client software by said server software; and (j) sending a request to close the session from said client software to the AS400 operating system software of the host computer.

19. The method of claim 17, farther comprising the steps of:

(h) sending a deallocation statement from the host computer to said client software;

(i) communicating said deallocation statement from said client software to said server software; and (j) causing the session between the intermediary server computer and the emulator protocol software of the client device to be closed according to said deallocation statement.

20. The method of claim 15, wherein the client device is a terminal emulator device and the emulator protocol software is a terminal emulation protocol software.

21. The method of claim 20, wherein said terminal emulation protocol software is TN5250 emulation protocol software.

22. The method of claim 21, wherein said server software is operated according to a TN5250 server communication protocol, and said client software is operated according to an APPC client communication protocol.

23. The method of claim 22, wherein the communication session between the intermediary server computer and the client device is performed according to the TCP/IP communication protocol.

24. The method of claim 23, wherein said client software of said communication interface software communicates with the AS400 operating system software through at least one AS400 application programming interface selected from the group consisting of ICF (Internal Communication Functions) and APPC.

25. The method of claim 15, wherein the client device is a printer emulator device and the emulator protocol software is a printer emulation protocol software.

26. The method of claim 15, wherein said request further includes at least one parameter selected from the group consisting of AS400 computer host name, status of emulator device as a printer or a terminal, and identity of the emulation protocol.

* * * * *